(No Model.) 2 Sheets—Sheet 1.
B. E. VAN AUKEN.
TEMPERATURE REGULATOR.
No. 494,399. Patented Mar. 28, 1893.
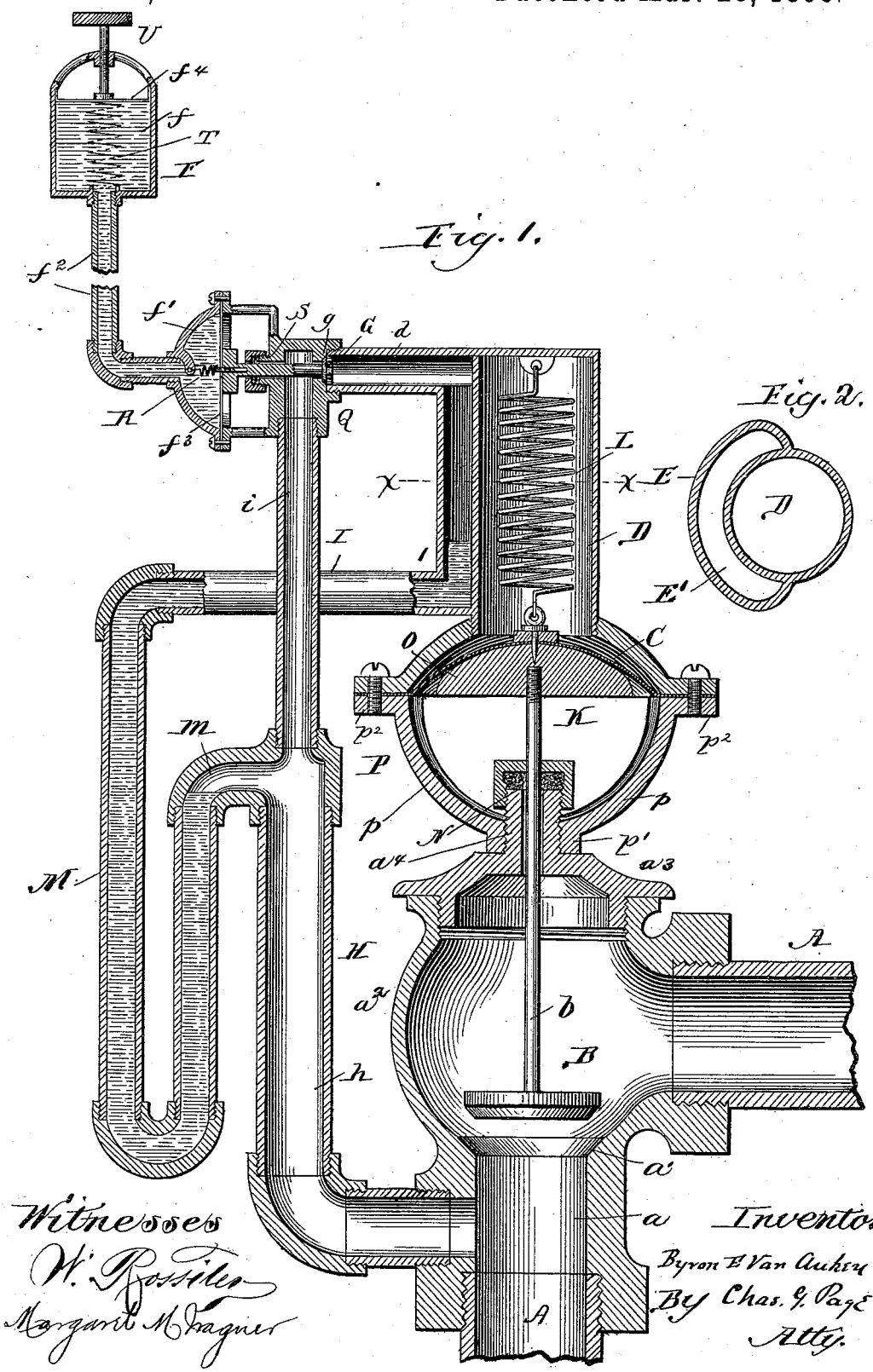
Witnesses
W. Rossiter
Margaret M. Wagner
Inventor
Byron E. Van Auken
By Chas. G. Page
Atty.
THE NORRIS PETERS CO., PHOTO-LITHO., WASHINGTON, D. C.

(No Model.) 2 Sheets—Sheet 2.
B. E. VAN AUKEN.
TEMPERATURE REGULATOR.
No. 494,399. Patented Mar. 28, 1893.
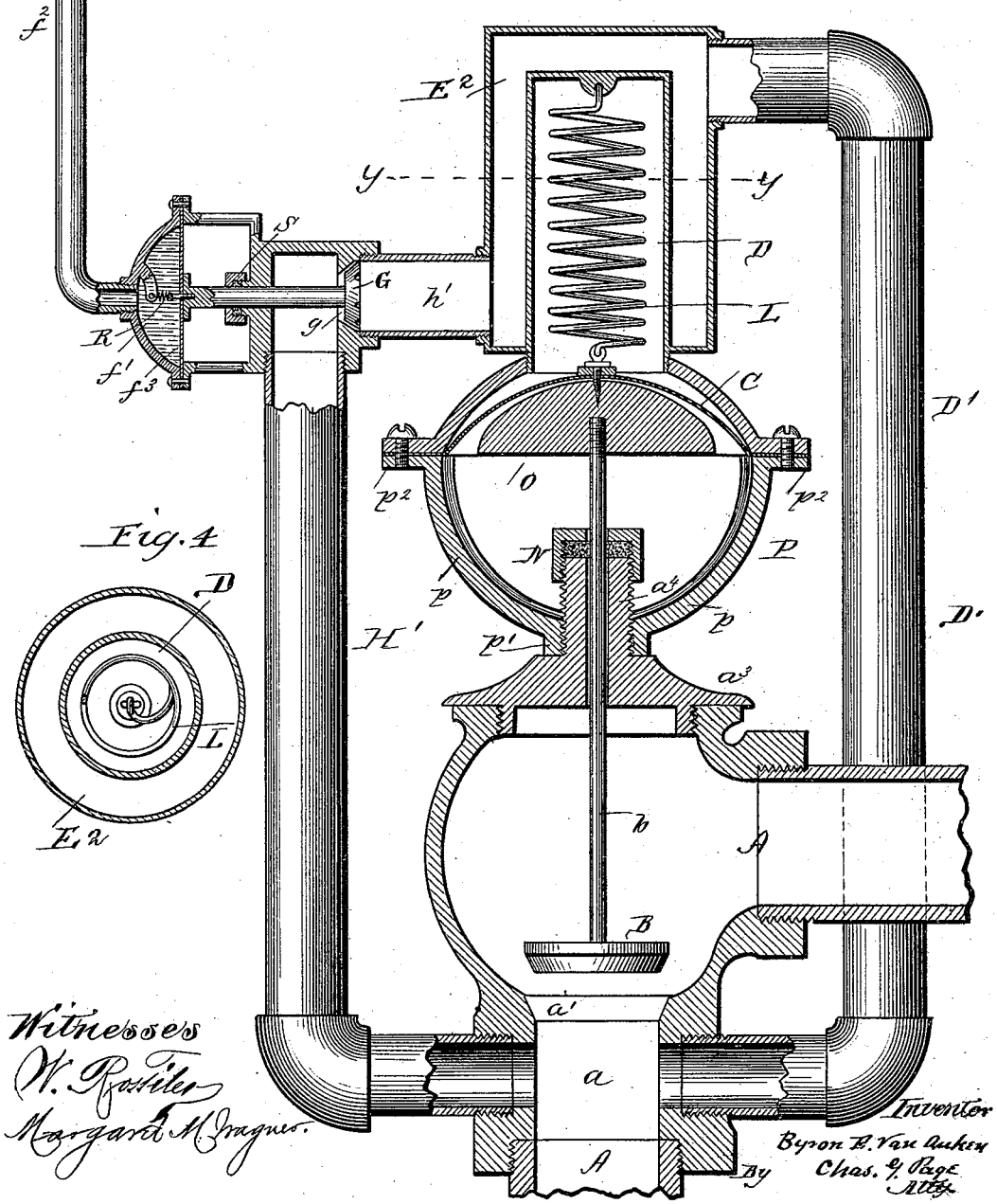
Witnesses
W. Rossiter
Margaret M. Wagner
Inventor
Byron E. Van Auken
By Chas. Y. Page
Atty

UNITED STATES PATENT OFFICE.

BYRON E. VAN AUKEN, OF CHICAGO, ILLINOIS, ASSIGNOR TO CLARENCE E. VAN AUKEN, OF SAME PLACE.

TEMPERATURE-REGULATOR.

SPECIFICATION forming part of Letters Patent No. 494,399, dated March 28, 1893.

Application filed July 31, 1891. Serial No. 401,272. (No model.)

*To all whom it may concern:*

Be it known that I, BYRON E. VAN AUKEN, a citizen of the United States, residing at Chicago, in the county of Cook and State of Illinois, have invented a new and useful Improvement in Temperature-Regulators, of which the following is a specification.

The object of my invention is to utilize the service supply of steam, hot-water or hot-air, as an agent for cutting off, and establishing the flow of the same from a source of supply to the point or points of service, and to such end I control a service supply valve by the action of a thermostat, and as a means for causing such action on the part of the thermostat, I subject the same to heat directly derived from a portion of the service supply of steam, hot-water or hot-air.

As a means for primarily governing the service supply valve from the temperature of a room or hall, I control the application of steam, hot-water or hot-air as an agent for operating the said service supply governing thermostat by a normally closed valve which is subject to and opened by the action of a temperature-controlled thermostat, so that when the temperature within the room reaches some determinate point the temperature-controlled thermostat will respond and open its allotted valve and thereby permit the flow of steam, hot-water or hot-air, from the main service supply to the point or points whereat the same is utilized to heat the service supply governing thermostat.

In the accompanying drawings, Figure 1, represents in vertical central section an apparatus particularly adapted for utilizing a supply of steam taken from the main service supply as a means for inducing pressure within the pressure chamber. Fig. 2, is a cross-section through the service supply governing thermostat and heating chamber on line $x$—$x$ in Fig. 1. Fig. 3, is a view similar to Fig. 1, with the apparatus particularly adapted for either hot-water or hot-air. Fig. 4, is a cross-section on line $y$—$y$ in Fig. 3.

In said drawings A indicates the main or service passage, and B denotes a valve for opening and closing the same. This said valve is subject to, and controlled in its position by the service supply governing thermostat comprising a movable piston or abutment C which operates the valve, and which is in turn subject to and operated by the expansion of a body of fluid within a pressure chamber D.

Pressure within the pressure chamber suitable for closing the service valve B, is created by the application of heat directly derived from a portion of the service supply, whether such supply consists of steam, hot-water or hot-air for supplying radiators, heaters and the like, and to such end I provide in connection with the pressure chamber, a suitably arranged heating chamber which may either be arranged within or external to the pressure chamber, it being evident that a heating chamber for such purpose could be made in various ways, as for example by a coil arranged within or around the pressure chamber, or by a large chamber entirely or partially surrounding the pressure chamber.

The pressure chamber in Fig. 1 is shown partially surrounded by a wall or jacket E arranged to form about the pressure chamber a heating chamber E' which is connected with the service passage at the supply side $a$ of its valve B, by a suitably arranged valved passage, the arrangement being such that should the external temperature rise to some predetermined point, the valved passage between the service passage and the heating chamber will be automatically opened by the action of the temperature-controlled thermostat F so as to permit steam, when such is used for supplying heat at the point or points of service, to enter the heating chamber and thereby heat the pressure chamber and cause therein a pressure sufficient to operate the movable abutment in a way to close the service valve B.

For the broader purpose of my invention, the two thermostats may be of any known or suitable construction, and the valve G for establishing and cutting off communication between the heating chamber and the service supply can be controlled and operated by its allotted thermostat in any convenient way.

In Fig. 1 wherein the apparatus is arranged with particular references to the use of steam, the passage for supplying steam to the steam-heating chamber is formed through pipes H and I whereof the latter connects with the heating chamber through the medium of a port $g$ which is normally closed by a valve G allotted to the temperature-controlled thermostat, a convenient and desirable arrangement being to provide the heating chamber with a laterally arranged extension or short pipe $d$ which is connected with the pipe I through the medium of said port. The movable abutment or piston C is preferably shown as being formed by a flexible diaphragm arranged as one of the ends or walls but desirably as the bottom wall of a hermetically sealed pressure chamber. The movable abutment C is also subject to a spring L which is arranged within the pressure chamber and applied so as to oppose a yielding spring resistance to the operation of the movable abutment in a direction to close the service supply valve B, in which way, said spring serves to maintain the service supply valve normally open.

By arranging the spring within the pressure chamber and attaching its ends respectively to the movable abutment and at the upper portion of the pressure chamber, I provide a simple and compact arrangement, and permit the expansive force of the fluid within the pressure chamber to depress the movable abutment against the retractile energy of the spring, in which way, I obtain perfect spring action and avoid compressing and crowding the spring when the movable abutment is operated in a direction to close the service valve.

The pressure chamber contains a body of fluid or liquid which when heated by reason of the presence of steam within the heating chamber will expand and thereby cause the movable abutment C to operate in a way to close the service supply valve and thereby cut off the flow of steam to the point or points of service. I may employ within the pressure chamber any suitable quantity of fluid or liquid which will readily expand when heated, it being observed that the use of alcohol, for example, as an agent for directly operating the movable abutment will be found desirable, although I may use any other suitable fluid or liquid. When therefore, the temperature of the hall or room within which the apparatus or the thermostat F is located, reaches some determinate degree said thermostat will respond and operate its allotted valve G so as to permit a supply of steam from the service supply to enter the heating chamber and heat the contents of the pressure chamber so as to operate the movable abutment C and cause the supply valve to close and so remain until a reduction of external temperature permits the thermostat valve G to again close and cut off the supply of steam from the heating chamber.

The pipe H is arranged as a lateral branch of the main supply pipe and leads from the same at the supply side $a$ of its valve B. At a point adjacent to the connection of the branch pipe H and its extension formed by the pipe I, said pipe H in Fig. 1 also connects with a laterally arranged branch pipe M which is arranged in the form of a siphon, having one of its legs or arms connected with the pipe H, and its remaining leg or arm connected with the heating chamber, it being observed that with this auxiliary, the steam supply passage for the heating chamber connects with the latter at its upper portion, and that the pipe M connects with said chamber at the lower portion of the same.

The pipe M contains a body of fluid, by preference water, which I employ as a means for cooling the contents of the pressure chamber after a reduction of the external temperature has permitted the thermostat valve G to close. When the thermostat valve G is closed, pressure within the passage $h$ of the pipe H will be communicated to the passage $m$ of the bent pipe M, and thereby cause the body of water therein to rise and fill the heating chamber E′. When however the thermostat valve G is open, steam entering the heating chamber from passage $i$ through pipe I will force the water down and out from said chamber, in which way, so long as the heating chamber is in open communication with the source of steam supply through the medium of the passage $h$ and $i$, and port $g$, the steam will fill said chamber and keep the water back within the passage $m$ as against pressure in passage $h$. As soon however as the thermostat valve closes the presure derived from the source of supply will again force the water up into the heating chamber and thereby permit the water to rapidly cool the contents of, and thereby so reduce the pressure within the pressure chamber, and thereby allow the spring L to draw up the movable abutment C and open the service supply valve B.

With reference to certain details of construction herein shown and involving matters of further improvement, the service supply valve B which closes upon the seat $a'$ within the shell $a^2$ has its stem $b$ arranged to extend up and work through a stuffing box N and connect with a half rounded block O which is attached to the center of the flexible diaphragm herein employed to form the piston or movable abutment. The spring L which is arranged within the central portion of the flexible diaphragm is at its upper end connected with the top wall of said chamber. The shell $a^2$ is closed at the top by a screw-cap $a^3$ which is centrally apertured for the passage of the valve stem and provided with a neck $a^4$ to which is detachably fitted a spider P. The spider P serves to support the pressure chamber, and comprises a suitable number of arms $p$ which are connected at their lower ends by a base ring $p'$ and at their upper ends adapted to form seats $p^2$ whereon the pressure chamber is secured. Said arms $p$ are also bowed outwardly from their lower ends so as to provide working space for the movable abutment and block O. The pipe H is connected with the smaller pipes I and M by suitable joints, and is arranged to rise from its point of connection with the service passage. The pipe I is connected with the hollow arm or pipe d by a coupling Q which affords a convenient support for the thermostat F. The thermostat F herein termed the temperature-controlled thermostat comprises a couple of chambers $f$ and $f'$ which are connected by the passage through a pipe $f^2$. Said pipe and the two chambers contain a suitable fluid or liquid, the preferred arrangement being to fill the chamber $f'$ and pipe $f^2$ with glycerine, and to fill the chamber $f$ with some highly volatile liquid such as ether. The chamber $f'$ has one of its sides formed by a flexible diaphragm $f^3$ forming a piston which connects with the valve G, so that when operated by pressure within said chamber it will open said valve. The valve G is normally closed by a spring R and is provided with a stem which is conveniently arranged to work through a stuffing box S and connect with the flexible diaphragm or piston $f^3$. A flexible diaphragm $f^4$ is arranged within the chamber $f$ and rests upon the body of liquid therein. A spring T is applied against the under side of the flexible diaphragm $f^4$ and an adjusting screw U is arranged to bear against the upper side of said diaphragm. By adjusting the screw U, the flexible diaphragm can be depressed against the resistance of spring T or be allowed to rise by the action of the spring, according to the direction in which the screw is turned. By such arrangement I provide an adjustable pressure chamber for rendering the thermostat F more or less responsive to external temperature, it being understood that by depressing the diaphragm the normal pressure against the piston or diaphragm $f^3$ in a direction to open the valve G will be increased and hence that the thermostat F will respond more readily. The thermostat F or practically its pressure chamber can therefore be adjusted for different degrees of temperature.

With reference to the use of the apparatus for govering a service supply of hot-water or hot-air, it will be only necessary to arrange for the application of the same to the service supply governing thermostat when the valve subject to the temperature-controlled thermostat F is opened. I have therefore in Fig. 3 shown an apparatus generally corresponding with the apparatus of Fig. 1 but with the pipe M omitted. Parts involving like constructions in said two figures are correspondingly lettered, and need not be described, since the foregoing description of the construction shown in Fig. 1 can be read in connection with Fig. 2 so far as it involves parts common to both figures. In Fig. 3 however I have shown a heating chamber $E^2$ arranged to surround the service supply governing thermostat so as to effectively utilize the heat from a portion of the service supply of hot-water or hot-air admitted into said chamber. I also arrange pipes H' and D' between the service pipe and the heating chamber in such manner that, when the valve G is open there will be a circulation of hot-water or hot-air through the pipe H', the heating chamber, and the pipe D'. Thus, when the thermostat valve G is closed, the fluid or liquid within chamber $E^2$ will cool since there can be no circulation through such chamber, although the warm fluid or liquid may of course rise to the top end of pipe D' which connects with the upper portion of such chamber, and while as a result of such there may be a certain degree of heat maintained within the upper part of chamber $E^2$ when pipe D' is connected therewith as shown, such heat will not be sufficient to operate the thermostat which actuates the service supply valve B. And as a matter of course, should pipe D' extend over and connect with the top end of the chamber $E^2$, then no heat will be maintained within such chamber. When however the thermostat valve G is open, heated fluid or liquid within pipe H' will obviously pass through the port opened by said valve and thence pass into the lower portion of chamber $E^2$ and then rise within the same, since it will be lighter than the cooled body of fluid or liquid therein. Regardless therefore of any pressure from the service supply, there will under the circumstances last mentioned be a circulation, as a result of the well known fact that warmer fluid will rise while the colder fluid will descend.

What I claim as my invention is—

1. In a temperature regulator, the combination of a service supply valve controlling a service supply of steam, hot-water or hot-air, a thermostat for operating the service supply valve, a valved passage arranged between the service supply and the thermostat so as to permit the application and utilization of a portion of the service supply of steam, hot-water or hot-air as a heating agent for operating the thermostat, and a temperature-controlled thermostat governing the application of the service supply of steam, hot-water or hot-air to the thermostat which operates the service supply valve, substantially as set forth.

2. In a temperature regulator a service supply valve controlling a service supply of steam, hot-water or hot-air, a thermostat controlling the service supply valve and comprising a pressure chamber having a movable abutment or piston which operates the service supply valve, a heating chamber connected with the service supply passage at the supply side of the service supply valve and arranged so that when supplied with steam hot-water or hot-air from the service supply, the same shall heat and operate the thermostat, and a temperature controlled thermostat governing the valve which opens and closes communication between the service supply of steam hot-water or hot-air, substantially as set forth.

3. In a temperature regulator the combination of a thermostat for governing the service supply, a heating chamber connected with the service supply by a valved passage and arranged to apply the heat of a portion of the service supply as a means for operating said thermostat, and a supplemental passage connected with the heating chamber and arranged to receive a body of cooling liquid which is expelled from the heating chamber by the service supply pressure when such service supply is admittted into the heating chamber substantially as set forth.

4. In a temperature regulator, a pressure chamber provided with a movable abutment or piston, a heating chamber arranged for communicating heat to the pressure chamber, and a supply of cooling liquid and means for automatically applying the same to cool the pressure chamber when the supply of heat is cut off from the heating chamber, substantially as set forth.

5. The combination in a temperature regulator of the service supply valve B arranged to control a service supply of steam, hot-water or hot-air, a pressure chamber D having its bottom formed by a movable abutment with which the stem of said valve is connected a spring L arranged within the pressure chamber to exert its retractile energy against the depression of the movable abutment, and a heating chamber having valved communication with a service supply or steam hot-water or hot-air, substantially as set forth.

BYRON E. VAN AUKEN.

Witnesses:
 CHAS. G. PAGE,
 MARGARET M. WAGNER.